(No Model.)  2 Sheets—Sheet 1.

C. B. McCOY.
COMBINED SEED DRILL AND FERTILIZER DISTRIBUTER.

No. 583,118.  Patented May 25, 1897.

Witnesses  
Inventor  
C. B. McCoy.  
by H. R. Willson  
Attorney (No Model.) 2 Sheets—Sheet 2.
C. B. McCOY.
COMBINED SEED DRILL AND FERTILIZER DISTRIBUTER.
No. 583,118. Patented May 25, 1897.

Witnesses
Inventor
C. B. McCoy
By H. B. Willson
Attorney

THE NORRIS PETERS CO., PHOTO-LITHO., WASHINGTON, D. C.

UNITED STATES PATENT OFFICE.

CHARLEY BRUCE McCOY, OF KLINE, TENNESSEE.

COMBINED SEED-DRILL AND FERTILIZER-DISTRIBUTER.

SPECIFICATION forming part of Letters Patent No. 583,118, dated May 25, 1897.

Application filed February 27, 1897. Serial No. 625,370. (No model.)

*To all whom it may concern:*

Be it known that I, CHARLEY BRUCE MC-COY, a citizen of the United States, residing at Kline, in the county of Franklin and State of Tennessee, have invented certain new and useful Improvements in a Combined Seed-Drill and Fertilizer-Distributer; and I do declare the following to be a full, clear, and exact description of the invention, such as will enable others skilled in the art to which it appertains to make and use the same.

My invention has relation to combined seed-drills and fertilizer-distributers, and more particularly to that class employed in drilling corn-peas and broom-cane corn, and also adapted to distribute the pulverized fertilizer as well.

The object of the invention is to provide a simple, convenient, and effective device for this purpose; and to this end the novelty consists in the construction, combination, and arrangement of the same, as will be hereinafter more fully described, and particularly pointed out in the claim.

In the accompanying drawings the same reference-characters indicate the same parts of the invention.

Figure 1:
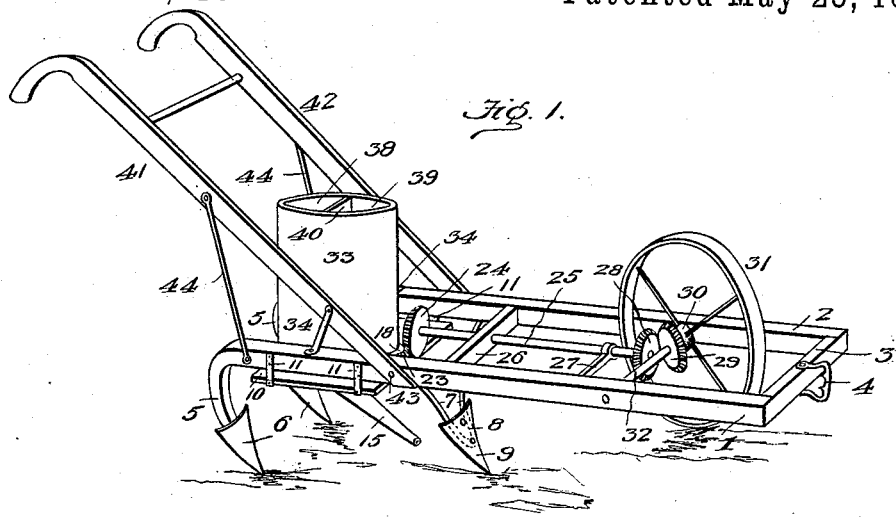
Figure 2:
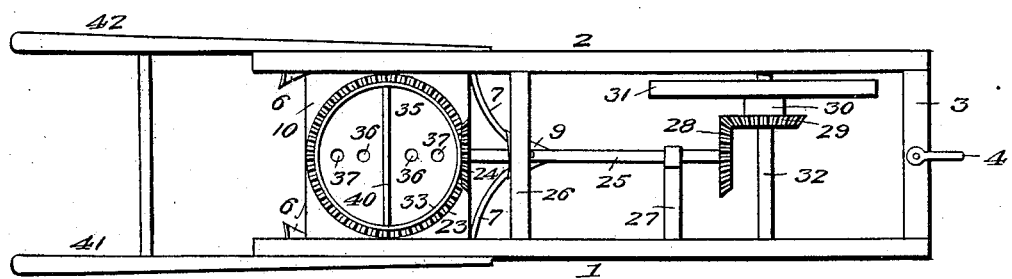
Figure 5:
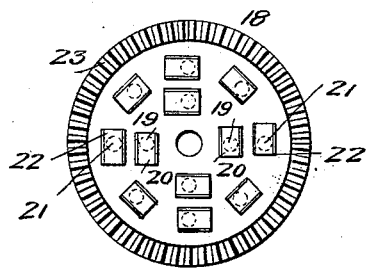
Figure 3:
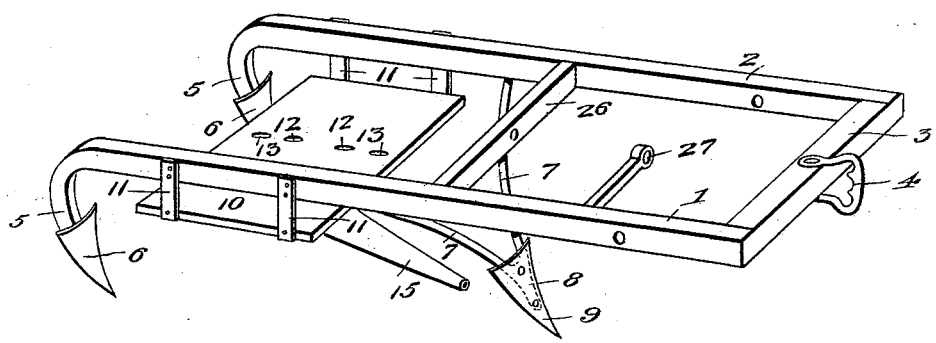
Figure 4:
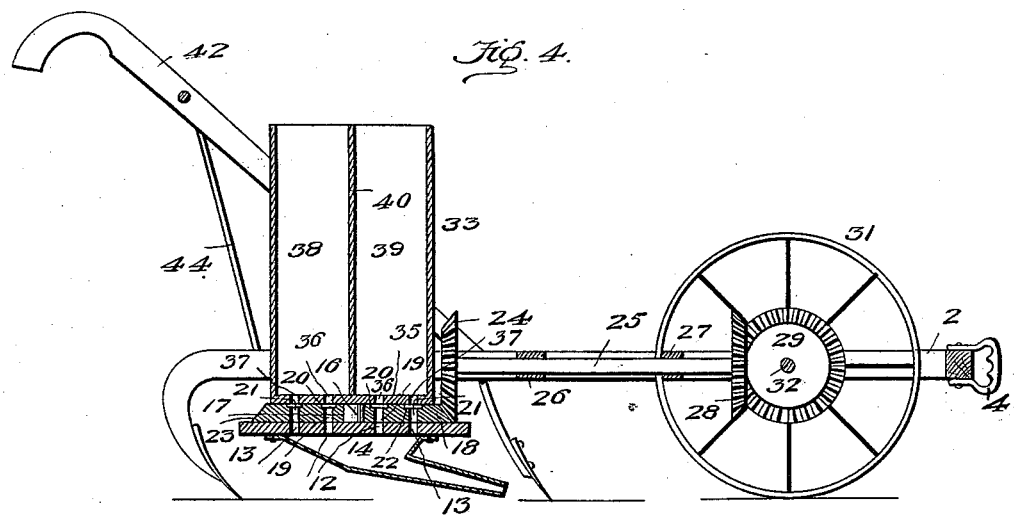

Figure 1 is a perspective view of my improved seed-drill. Fig. 2 is a top plan view. Fig. 3 is a perspective view with the hopper and operating-wheel removed. Fig. 4 is a longitudinal section, and Fig. 5 is a detached plan view of the rotary feed-plate.

The frame consists of the parallel side bars 1 and 2, their forward ends being connected by an integral cross-brace 3, to which the usual clevis 4 is swiveled. The rear ends of the side bars are curved downwardly to form the usual standards 5 5, to which the detached converging shovel-blades 6 are attached.

7 7 represent converging brackets secured to the side bars, and their lower ends terminate in the forwardly and downwardly projecting standard 8, the lower end of which carries the detachable furrow-opening shovel 9.

10 represents a horizontal platform suspended a short distance below the side bars 1 and 2 by the straps 11 11, secured to said side bars.

12 and 13 represent two discharge-orifices longitudinally arranged in said platform, and immediately below said orifices is a forwardly-inclined chute 14, terminating in a discharge-spout 15, the lower end of which terminates immediately behind and in line with the shovel-blade 9.

16 represents a vertical stud projecting upwardly from said platform, which forms a bearing for the central orifice 17 in the circular seed-plate 18. This seed-plate is provided with adjustable slides 20, and a second annular series of orifices is arranged outside of the first mentioned and are likewise provided with adjustable slides 22, by means of which the size of the openings or orifices may be increased or diminished or entirely closed at will. The orifices 19 in the plate register with the orifice 12 and the orifices 21 with the orifice 13 in the platform. The outer end of the upper face of this circular seed-plate 18 is formed with a bevel gear-wheel 23, which receives motion from a bevel-pinion 24 on a longitudinal horizontal shaft 25, the rear end of which is journaled in a cross-brace 26, secured at its opposite ends to the side bars 1 and 2, while its forward end has a bearing in a bracket 27, secured to the side bar 1. The forward end of said shaft 25 carries a bevel gear-wheel 28, which meshes with a similar bevel gear-wheel 29, formed on the side of the hub 30 of the operating-wheel 31, which is fixed on the transverse shaft 32, journaled in the side bars 1 and 2. From this construction it will be seen that the operating-wheel 31 in traveling over the ground imparts a continuous rotary motion to the seed-plate 18 through the medium of the bevel-gears and shaft 25.

33 represents the vertical cylindrical hopper detachably secured by brackets 34 34 to the frame, so that its bottom 35 fits snugly on the seed-plate, and the orifices 36 37 in its bottom will aline with the orifices 12 and 13, respectively, in the platform 10 and the corresponding orifices 19 and 21 in the seed-plate 18.

The hopper 33 is divided into two compartments 38 39 by the vertical partition 40, and by placing seed-corn in one compartment and seed-peas in the other they will be alternately dropped in the furrow made by the blade 9 and covered in by the converging blades 6 6.

If desired, corn or peas may be placed in the front compartment of the hopper and any suitable pulverized fertilizer in the rear compartment and the two simultaneously dropped.

The usual handles 41 42 are secured at their forward ends to the side bars 1 2 by a brace-bolt 43, and the sides of the handles farther back are supported by the diagonal braces 44.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A combined seed-dropper and fertilizer-distributer comprising the parallel side bars 1 and 2, their forward ends connected by the integral cross-brace 3 and having their rear ends curved downwardly to form standards 5 5, the lower ends of which carry the covering-blades, the converging brackets 7 7 carrying the opening-blade 9, the horizontal platform 10 secured to the side bars and provided with discharge-orifices 12 and 13, the fixed vertical stud 16, the inclined chute 14 and discharge-spout 15, in combination with the circular rotating seed-plate 18 provided with the central orifice 17 engaging the stud 16, the seed openings or orifices 19 21 arranged in different concentric circles and provided with adjustable slides, and having their beveled gear-wheel 23 formed on its upper face, the longitudinal shaft 25 journaled in brackets secured to the side bars and provided at its rear end with a beveled pinion 24 meshing with the gear-wheel 23, the beveled gear-wheel 28 fixed on the forward end of said shaft 25, the transverse shaft 32 journaled in the frame and provided with the operating-wheel 31 and bevel-gear 29 meshing with the gear-wheel 32 on the shaft 25, the vertical cylindrical hopper 33 fixed in the frame and provided with the central transverse partition 40, and having the discharge-orifices 36 37 in its bottom 35 in vertical alinement with the orifices 12 13 respectively, substantially as and for the purposes set forth.

In testimony whereof I hereunto affix my signature in presence of two witnesses.

CHARLEY BRUCE McCOY.

Witnesses:
A. B. CLARK,
G. M. McCOY.